(12) United States Patent
Baughman et al.

(10) Patent No.: US 12,174,869 B2
(45) Date of Patent: Dec. 24, 2024

(54) AUTOMATED NATURAL LANGUAGE GENERATION AND SELECTION

(71) Applicant: INTERNATIONAL BUSINESS MACHINES CORPORATION, Armonk, NY (US)

(72) Inventors: Aaron K. Baughman, Cary, NC (US); Gray Franklin Cannon, Atlanta, GA (US); Nicholas Michael Wilkin, Issaquah, WA (US); Eris Opal Rashon Calhoun, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 17/301,068

(22) Filed: Mar. 24, 2021

(65) Prior Publication Data

US 2022/0309245 A1 Sep. 29, 2022

(51) Int. Cl.
*G06F 40/289* (2020.01)
*G06F 16/34* (2019.01)
(Continued)

(52) U.S. Cl.
CPC .......... *G06F 16/345* (2019.01); *G06F 40/289* (2020.01); *G06N 5/04* (2013.01);
(Continued)

(58) Field of Classification Search
CPC .... G06F 16/345; G06F 40/289; G06F 40/186; G06F 40/56; G06N 5/04; G06N 20/00;
(Continued)

(56) References Cited

U.S. PATENT DOCUMENTS 7,305,336 B2   12/2007   Polanyi
7,346,493 B2   3/2008    Ringger
(Continued)

FOREIGN PATENT DOCUMENTS

KR   101084786 B1   11/2011

OTHER PUBLICATIONS

Asghar, Nabiha, et al.; Affective Neural Response Generation; arXiv:1709.03968v1; Sep. 12, 2017; 9 pages.
(Continued)

*Primary Examiner* — Shahid K Khan
*Assistant Examiner* — Ahamed I Nazar
(74) *Attorney, Agent, or Firm* — Schmeiser, Olsen & Walts, LLP; Edward Wixted

(57) ABSTRACT

A method, system, and computer program product for implementing machine learning natural language digital package generation and selection is provided. The method includes receiving from hardware and software sources, factual data associated with an event. In response, natural language digital templates comprising natural language phrase variants for each portion of the factual data is generated. Factual data phrases are generated and packaged into digital packages including at least one natural language phrase variant with respect to each portion of factual data. An initial package is selected by minimizing a number of repetitions of the factual data phrases across the digital packages and digital summaries are extracted. Alignment attributes associated with the digital summaries are determined with respect to the initial package and a final package is selected. A hardware device is enabled for presenting a video stream including the final package with respect to the event.

16 Claims, 8 Drawing Sheets

(51) Int. Cl.
*G06N 5/04* (2023.01)
*G06N 20/00* (2019.01)
*H04N 21/234* (2011.01)
*H04N 21/235* (2011.01)

(52) U.S. Cl.
CPC ........... *G06N 20/00* (2019.01); *H04N 21/234* (2013.01); *H04N 21/235* (2013.01)

(58) Field of Classification Search
CPC ............... G06N 3/0455; H04N 21/234; H04N 21/235; H04N 21/251; H04N 21/8133; H04N 21/84; H04N 21/8549
USPC ......................................................... 715/245
See application file for complete search history.

(56) References Cited

U.S. PATENT DOCUMENTS

| | | | |
|---|---|---|---|
| 8,887,286 B2 | 11/2014 | Dupont | |
| 8,892,419 B2 | 11/2014 | Lundberg | |
| 9,483,582 B2* | 11/2016 | Gaucher | G06F 16/90332 |
| 9,483,730 B2 | 11/2016 | Di Fabbrizio | |
| 10,592,554 B1 | 3/2020 | Merritt | |
| 2004/0193401 A1 | 9/2004 | Ringger | |
| 2012/0035912 A1* | 2/2012 | Litvak | G06F 16/345 704/8 |
| 2015/0339288 A1* | 11/2015 | Baker | G06F 40/166 704/9 |
| 2017/0238055 A1* | 8/2017 | Chang | G06V 20/42 725/19 |
| 2021/0375289 A1* | 12/2021 | Zhu | G10L 15/22 |

OTHER PUBLICATIONS

Csaky, Richard K.; Deep Learning Based Chatbot Models; Scientific Students' Associations Report; arXiv:1908.08835v.1; Aug. 23, 2019; 67 pages.

Dethlefs, Nina et al.; Optimising Natural Language Generation Decision Making for Situated Dialogue; 12th Annual Meeting of the Special Interest Group on Discourse and Dialog; Jun. 17-18, 2011; pp. 78-87.

Gao, J et al.; Neural Approaches to Conversational AI; arXiv:1809.08267v1; Sep. 21, 2018; 85 pages.

IP.com An Unobtrusive Entropy Based Performance Optimization Comparator; IPCOM000218213D; May 28, 2012; 6 pages.

IP.com; A Maximum-Entropy Based Confidence Metric for a Statistical Parser; IPCOM000028875D; Jun. 5, 2004; 2 pages.

IP.com; Autowriter: Natural Language Expansion From Bullet Points Using Background Documents Conditioned on Target; IPCOM000256006D; Oct. 30, 2018; 6 pages.

IP.com; Natural Language Description Application to Test Reports; IPCOM000261515D; Mar. 11, 2020; 4 pages.

Ishizuka, Mitsuru; A Common Concept Description of Natural Language Texts as the Foundation of Semantic Computing on the Web; 2008 IEEE International Conference on Sensor Networks, Ubiquitous, and Trustworthy computing; Jun. 11-13, 2008.

Masud, M.A.N. et al.; A general approach to natural language conversion; 7th International Multi Topic Conference; Jan. 2004.

McCoy, Kathleen F. McCoy, PhD; Natural Language Generation and Assistive Technologies; 7th International Natural Language Generation Conference; May 2012; 1 page.

Nafari, Maryam et al; Query2Question: Translating Visualization Interaction into Natural Language; IEEE Transactions on Visualization and Computer Graphics; vol. 21, Issue 6, Jun. 1, 2015; pp. 756-769/.

Popowich, Fred et al; Interactive Natural Language Query Construction for Report Generation; 7th International Natural Language Generation conference; May 2012; pp. 115-119.

Rathmanner, S. et al.; A Philosophical Treatise of Universal Induction; Entropy 2011, vol. 13; Jun. 3, 2011; pp. 1076-1136.

Transmittal Form PTO/SB/21, Dated Feb. 4, 2020, 2 Pages.

Mell, Peter et al.; "The NIST Definition of Cloud Computing;" National Institute of Standards and Technology; Special Publication 800-145; Sep. 2011; 7 pages.

* cited by examiner

AUTOMATED NATURAL LANGUAGE GENERATION AND SELECTION

BACKGROUND

The present invention relates generally to a method for automating digital package generation and selection and in particular to a method and associated system for improving software technology associated with generating and packaging natural language templates and phrases for selection associated with video stream presentation.

SUMMARY

A first aspect of the invention provides a machine learning natural language digital package generation and selection method comprising: receiving, by a processor of a server hardware device from a plurality of hardware and software sources, factual data associated with an event; generating by said processor in response to said receiving said factual data, natural language digital templates comprising natural language phrase variants for each portion of said factual data; generating by said processor, a plurality of factual data phrases for said digital templates; packaging, by said processor, said plurality of factual data phrases into digital packages comprising at least one natural language phrase variant of said natural language phrase variants with respect to each said portion of said factual data; selecting by said processor executing natural language code, an initial package of said digital packages by minimizing a number of repetitions of said factual data phrases across said digital packages; extracting from Internet sources, by said processor, digital summaries associated with said initial package; determining, by said processor, alignment attributes associated with said digital summaries with respect to said initial package; selecting, by said processor with respect to initialization for a user, a final package of said digital packages, wherein final package comprises a group of factual data phrases of said factual data phrases optimized for minimized repetitions and maximized quality; and enabling, by said processor, a hardware device for presenting a video stream comprising said final package with respect to said event.

A second aspect of the invention provides a computer program product, comprising a computer readable hardware storage device storing a computer readable program code, said computer readable program code comprising an algorithm that when executed by a processor of a server hardware device implements a machine learning natural language digital package generation and selection, said method comprising: receiving, by said processor from a plurality of hardware and software sources, factual data associated with an event; generating by said processor in response to said receiving said factual data, natural language digital templates comprising natural language phrase variants for each portion of said factual data; generating by said processor, a plurality of factual data phrases for said digital templates; packaging, by said processor, said plurality of factual data phrases into digital packages comprising at least one natural language phrase variant of said natural language phrase variants with respect to each said portion of said factual data; selecting by said processor executing natural language code, an initial package of said digital packages by minimizing a number of repetitions of said factual data phrases across said digital packages; extracting from Internet sources, by said processor, digital summaries associated with said initial package; determining, by said processor, alignment attributes associated with said digital summaries with respect to said initial package; selecting, by said processor with respect to initialization for a user, a final package of said digital packages, wherein final package comprises a group of factual data phrases of said factual data phrases optimized for minimized repetitions and maximized quality; and enabling, by said processor, a hardware device for presenting a video stream comprising said final package with respect to said event.

A third aspect of the invention provides a server hardware device comprising a processor coupled to a computer-readable memory unit, said memory unit comprising instructions that when executed by the computer processor implements a machine learning natural language digital package generation and selection method comprising: receiving, by said processor from a plurality of hardware and software sources, factual data associated with an event; generating by said processor in response to said receiving said factual data, natural language digital templates comprising natural language phrase variants for each portion of said factual data; generating by said processor, a plurality of factual data phrases for said digital templates; packaging, by said processor, said plurality of factual data phrases into digital packages comprising at least one natural language phrase variant of said natural language phrase variants with respect to each said portion of said factual data; selecting by said processor executing natural language code, an initial package of said digital packages by minimizing a number of repetitions of said factual data phrases across said digital packages; extracting from Internet sources, by said processor, digital summaries associated with said initial package; determining, by said processor, alignment attributes associated with said digital summaries with respect to said initial package; selecting, by said processor with respect to initialization for a user, a final package of said digital packages, wherein final package comprises a group of factual data phrases of said factual data phrases optimized for minimized repetitions and maximized quality; and enabling, by said processor, a hardware device for presenting a video stream comprising said final package with respect to said event.

The present invention advantageously provides a simple method and associated system capable of automating digital package generation and selection for efficient software execution.

DETAILED DESCRIPTION

Figure 1:
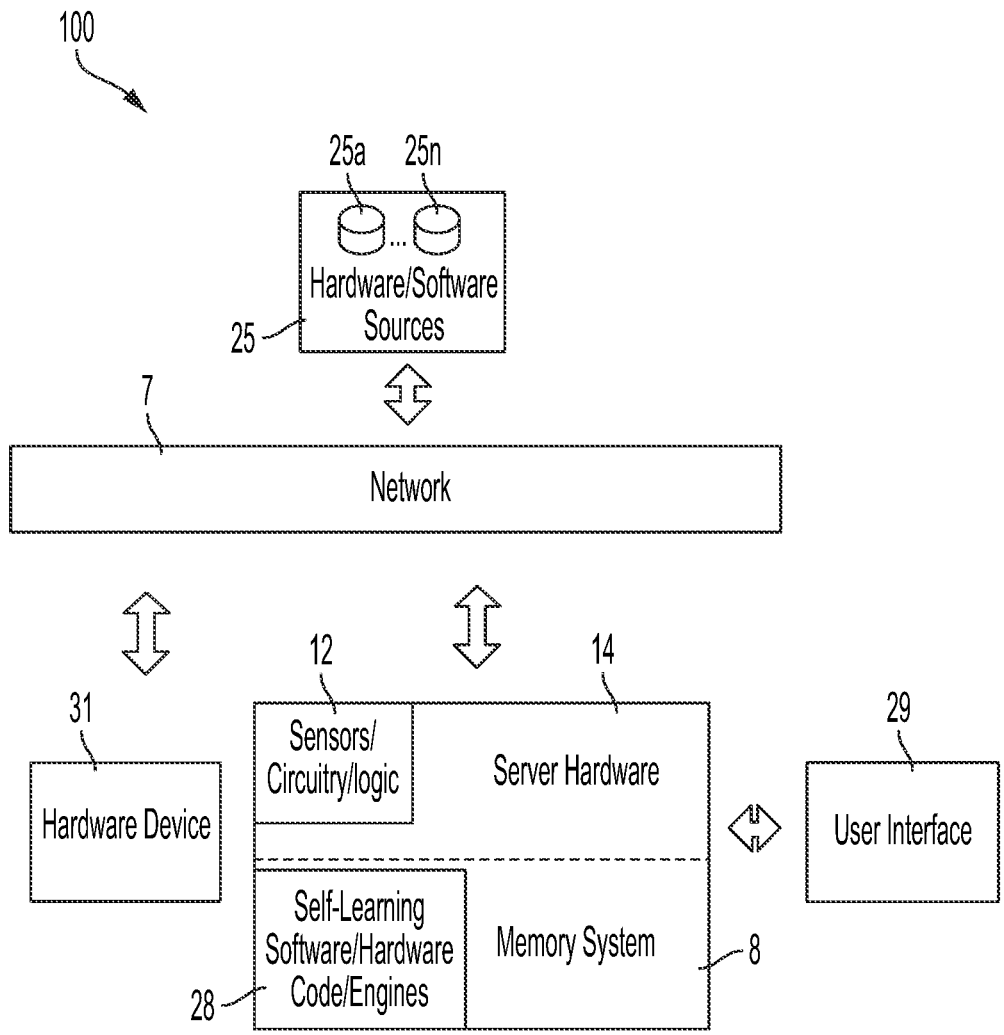
FIG. 1 illustrates a system for improving software technology associated with generating and packaging natural language templates and phrases for selection associated with video stream presentation, in accordance with embodiments of the present invention.

FIG. 1 illustrates a system 100 for improving software technology associated with generating and packaging natural language templates and phrases for selection associated with video stream presentation, in accordance with embodiments of the present invention. Differing types of natural language processes are typically created to enable an audience to focus on particular insights. One type of natural language generation (NLG) process may be focused around statistics or facts associated with an event. Resulting sentences that are generated may be used to create a narration within a singular point in time or bounded by a microevent. A complementary NLG process may be configured to produces broad insights that culminate with respect to opinions and broad events thereby creating a color commentary adding toa personality of storytelling via written prose created by artificial intelligence. However, determining how to combine fact-based NLG processes and broad-based NLG processes may be difficult as both types of the aforementioned NLG processes are necessary to engage a consumer with diverse insights that include both entertaining facts and opinion pieces. Therefore, system 100 comprises an automated cognitive system designed to generate self-learning templates associated with multiple types of NLG process based sentences and selects a diverse set of code and text that is fluent and entertaining. Additionally, system 100 enables digital and analog media producers to automatically generate natural language statistical content meeting video quality standards with respect to a speed not achievable by human writers and editors thereby improving an operation of video presentation hardware systems. Likewise, system 100 enable Internet media consumers quicker access to high quality statistical content thereby enabling a user to proceed to multiple locations for automated video editing and presentation processes.

System 100 is enabled to:
1. Optimize a sentence quality subject to single or multiple word repetition constraint across collections of varying generated sentences.
2. Develop a comprehensive learning hardware/software framework for combining reinforcement learning code, supervised learning code, and hierarchical information state code.
3. Generate packages of natural language sentence variants based on distinct language statistics.

System 100 of FIG. 1 includes server hardware 14, hardware/software sources 25, a hardware device 31, and a user interface 29 interconnected through a network 7. Server hardware 14 comprises sensors/circuitry/logic 12 and a (specialized) memory system 8. Memory system 8 comprises self-learning software code/engines 28 including executable code. Memory system 8 may include a single memory system. Alternatively, memory system 8 may include a plurality of memory systems. Hardware/software sources 25 comprise remote source systems (e.g., media such as news sources, Internet information sources, social media sources, etc.) and may include databases 25a . . . 25n. Server hardware 14, hardware/software sources 25, hardware device 31, and user interface 29 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware 14, hardware/software sources 25, hardware device 31, and user interface 29 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-8. The specialized discrete non-generic analog, digital, and logic-based circuitry (e.g., sensors/circuitry/logic 12, etc.) may include proprietary specially designed components (e.g., a specialized integrated circuit, such as for example an Application Specific Integrated Circuit (ASIC) designed for only implementing an automated process for improving software technology associated with generating and packaging natural language templates and phrases for selection associated with video stream presentation. Sensors/circuitry/logic 12 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 generates and selects natural language digital packages based on phrases associated with fact-based and broad-based NLG processes. The packages are optimized with respect to quality volumes. An associated quality metric is generated from software trained bidirectional encoder representations from transformers (BERT) code based on argumentative quality and syntax correctness.

Execution of NLG processes with respect to fact-based sentences may be associated with word repetition that may present a common problem within systems that generate natural language processes. For example, human operators may typically vary their syntax and diction such that increased variety is generally viewed as emblematic of acceptable writing. Therefore, reducing word repetition may enable an improvement with respect to a digital writing style and an operation of system 100. In the domain of statistical text output, an associated metric (for measuring repetition within natural language) may comprise the repetition of n-grams such that single words (i.e., 1-gram) or multiple consecutive words allow for repetition measurement. Therefore, system 100 is configured to ingest a number of distinct statistics and generate several natural language sentence variants for each statistic. Digital packages comprising statistical sentences are created and are comprised of at least 1 sentence variant for each statistic. As a result, an objective of an optimization problem is to minimize a number of repetitions collectively across selected digital packages of sentences based on the following determined variables:

$p$ = number of sentences in package $r$ = repetitions in package $r_i$ = repetitions in sentence variant $i$ $y_i$ = inclusions of sentence variant $i$ in package $n$ = number of sentence variants to be analyzed across all stats $w_i$ = quality volume of sentence variant $i$ $t_w$ = floor threshold of quality volume $v$ = number of variants generated $t_v$ = ceiling threshold of selected variants for a statistic $$\text{minimize } r = \sum_{i=1}^{n} y_i r_i$$

The following constraints are configured to bound a minimization process:

A first constraint specifies that a count of selected variants within a digital package must equal to a desired number of sentences as follows:

$\Sigma_{i=1}^{n} y_i = p$ where $i \in N\{1, \ldots, n\}$

A second constraint specifies that at least one variant for each statistic must be included within the digital package. A count for the at least one variant will not exceed maximum allowable inclusions of a single statistic as follows:

$1 \leq \Sigma_{i=1}^{v} y_i \leq s$ where $i \in V\{1, \ldots, v\}$

A third constraint specifies that each selected variant must meet or exceed the quality volume floor as follows:

$w_i \geq t_w$ where $i \in N$

A fourth constraint specifies that a scaler $y_i$ determines if a sentence or digital variant is used as follows:

$y_i = 0$ or $1$ where $i \in N$ such that a definition of y is as follows:

$$y_i = \left\{ \begin{array}{c} 1 \text{ if sentence variant } i \text{ used} \\ 0 \text{ otherwise} \end{array} \right\}$$

Alternatively, a digital sentence variety may be optimized by maximizing an entropy such that higher values of the entropy indicate a greater variety. Repetition or entropy attributes may be employed as a target of the optimization process or as constraints to select natural text as follows ([where H=Entropy, p=probability, and i=word/token index):

$$H(p) = -\sum_i p_i \log p_i$$

System 100 is further configured to select packages including both fact-based and broad-based sentences such that:

$w_j$=quality volume of sentence j $c$=quality volume of bin

Likewise, each sentence portion is assigned to a single bin such a total quality volume of all sentences in each bin does not exceed c. A total number of bins used should be minimized. As a result, an objective of an optimization process comprises minimizing a total number of bins used to hold all sentences as follows:

$$\text{minimize } z = \sum_{i=1}^{n} y_i$$

The following constraint process bound how sentences are allocated to bins. A first step is configured to determine that a quality volume, w, for each item assigned to a bin, x, is less than or equal to a total quality volume of a bin as follows:

$\Sigma_{j=1}^{n} w_j x_{ij} \leq c y_i$ where $i \in N\{1, \ldots, n\}$

Likewise, each sentence portion may be assigned to only a single bin as follows:

$\Sigma_{i=1}^{n} x_{ij} = 1$ where $j \in N$

Additionally, a scaler $y_I$ determines if a bin is used or not as follows:

$y_i = 0$ or $1$ where $i \in N$

A scaler $x_{ij}$ is configured to determine if an item j is assigned to bin I as follows:

$x_{ij} = 0$ or $1$ where $i \in N, j \in N$

Additionally, definitions for x and y are as follows:

$$y_i = \left\{ \begin{array}{c} 1 \text{ if bin } i \text{ used} \\ 0 \text{ otherwise} \end{array} \right\}$$

$$x_{ij} = \left\{ \begin{array}{c} 1 \text{ if item } j \text{ is assigned to bin } i \\ 0 \text{ otherwise} \end{array} \right\}$$

Figure 2:
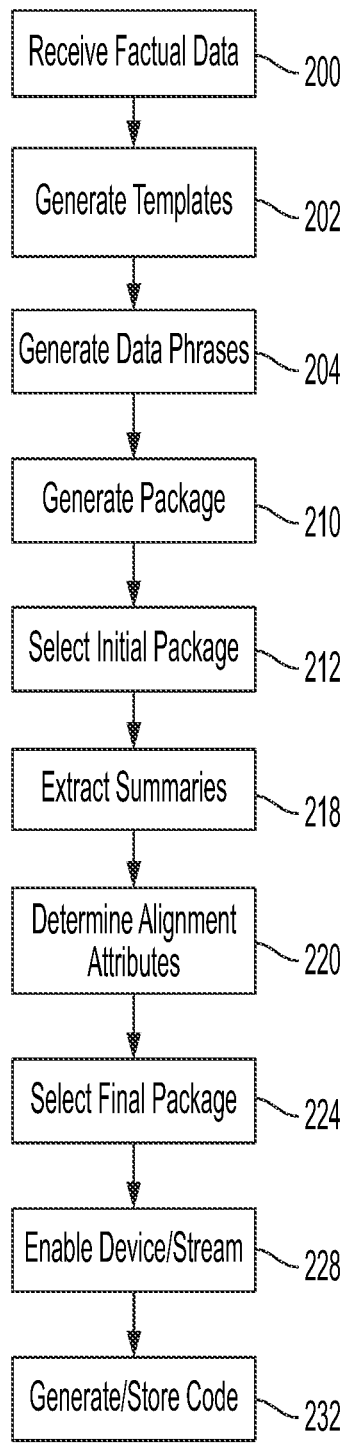
FIG. 2 illustrates an algorithm detailing a process flow enabled by the system of FIG. 1 for improving software technology associated with generating and packaging natural language templates and phrases for selection associated with video stream presentation, in accordance with embodiments of the present invention.

FIG. 2 illustrates an algorithm detailing a process flow enabled by system 100 of FIG. 1 for improving software technology associated with generating and packaging natural language templates and phrases for selection associated with video stream presentation, in accordance with embodiments of the present invention. The algorithm implements a machine learning natural language generation and selection process. Each of the steps in the algorithm of FIG. 2 may be enabled and executed in any order by a computer processor(s) executing computer code. Additionally, each of the steps in the algorithm of FIG. 2 may be enabled and executed in combination by server hardware 14, hardware/software sources 25, and hardware device 31. In step 200, factual data associated with an event (e.g., a sporting event video presentation) is received (by a server hardware device) from hardware and software sources. The factual data may include statistical data and media related data associated with the event. In step 202, natural language digital templates are generated. The natural language digital templates may include natural language phrase variants for each portion of the factual data. In step 204, factual data phrases for the digital templates are generated in response to execution of natural language code. In step 210, the factual data phrases are packaged into digital packages including at least one natural language phrase variant of the natural language phrase variants with respect to each portion of factual data.

In step 212, an initial package of the digital packages is selected by minimizing a number of repetitions of the factual data phrases across the digital packages. The number of repetitions may include, inter alia, single phrase repetition constraints, multiple phrase repetition constraints, etc. A minimization process may include assigning a specified number of selected natural language phrase variants (within selected packages of the digital packages) equal to a number of desired phrases and a natural language phrase variant for each portion of the factual data included within an associated package. A total count of phrase variants may not exceed a maximum number of inclusions for a single portion of factual data. Each natural language phrase variant may be equal to or exceed a specified quality volume floor. The minimization process may additionally or alternatively include executing code comprising: $r=\Sigma_{i=1}{}^n y_i r_i$, where r=a number of phrase repetitions within the at least one package, n=a number of phrase variants of the natural language phrase variants analyzed with respect to the factual data, $y_i$=inclusion of a phrase variant i within the at least one package, the inclusion=1, an associated exclusion=0, and $r_i$=a number of phrase repetitions within a phrase variant i.

In step 218, digital summaries associated with the initial package are extracted from Internet sources. In step 220, alignment attributes associated with the digital summaries are determined with respect to the initial package. In step 224, a final package is selected from the digital packages. The final package includes a group of factual data phrases optimized for minimized repetitions and maximized quality. Likewise, a phrase variety may be maximized by maximizing an associated entropy (randomness attributes collected by an operating system or application (via hardware sensors from hardware sources) for use in cryptography or random data processes). Specified values of an associated entropy indicate a greater variety within a statistical phrase. The entropy may be generated by executing the following code based on: $H(p)=-\Sigma_i p_i \log p_i$, such that H=the associated entropy, p=an associated probability, and i=word or token index associated with the associated entropy.

The final package may include a group of factual data phrases of the factual data phrases optimized for minimized repetitions and maximized quality. Selecting the final package may include assigning each data phrase (of the plurality of factual data phrases) to a single bin of a multiple bins. A total quality volume of all factual data phrases within each bin does is configured not to exceed a pre-determined level and a total number of bins. Likewise, only one statistical phrase is assigned to each bin and total quality volume for each statistical phrase is configured to not exceed the total quality volume of an assigned bin.

In step 228, a hardware device is enabled for presenting a video stream including the final package with respect to the event. In step 232, self learning software code is generated for executing future processes associated with executing the aforementioned machine learning natural language code generation and optimization process. The self learning software code is stored within a modified portion of a memory structure of the server hardware device.

Figure 3:
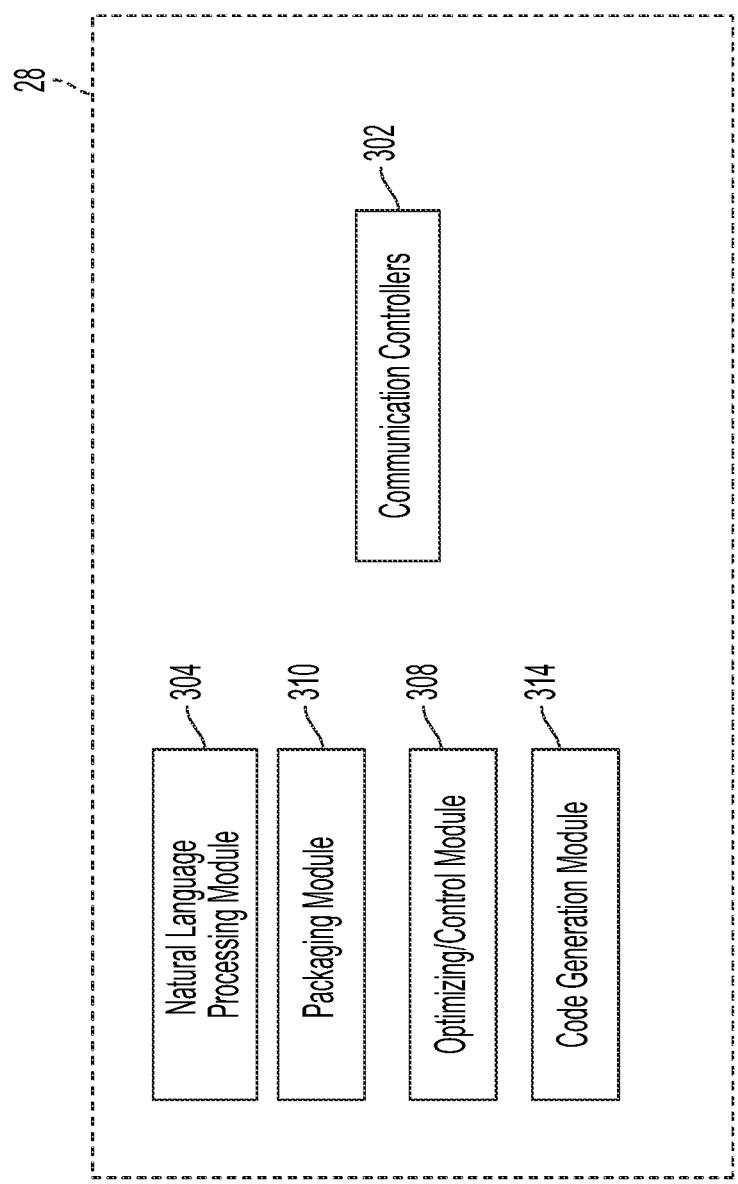
FIG. 3 illustrates an internal structural view of the self-learning software/hardware code/engine of FIG. 1, in accordance with embodiments of the present invention.

FIG. 3 illustrates an internal structural view of self-learning software/hardware code engines 28 of FIG. 1, in accordance with embodiments of the present invention. Self-learning software/hardware structure 121 includes a natural language generation and processing module 304, a packaging module 310, an optimizing/control module 308, a code generation module 314, and communication controllers 302. Natural language generation and processing module 304 comprises specialized hardware and software for controlling all functions related to generating and selecting the natural language phrases in accordance with embodiments of the present invention. Packaging module 310 comprises specialized hardware and software for controlling all functionality related to generating the digital packages described with respect to the algorithm of FIG. 2. Optimizing/control module 308 comprises specialized hardware and software for controlling all functions related to the optimization and control steps of FIG. 2. Code generation module 314 comprises specialized hardware and software for controlling all functions related to generating all code and machine learning feedback for generating self-learning software code for executing future processes associated with executing the generating and packaging natural language method of the algorithm of FIG. 2. Communication controllers 302 are enabled for controlling all communications between natural language generation and processing module 304, packaging module 310, optimizing/control module 308, and code generation module 314.

Figure 4:
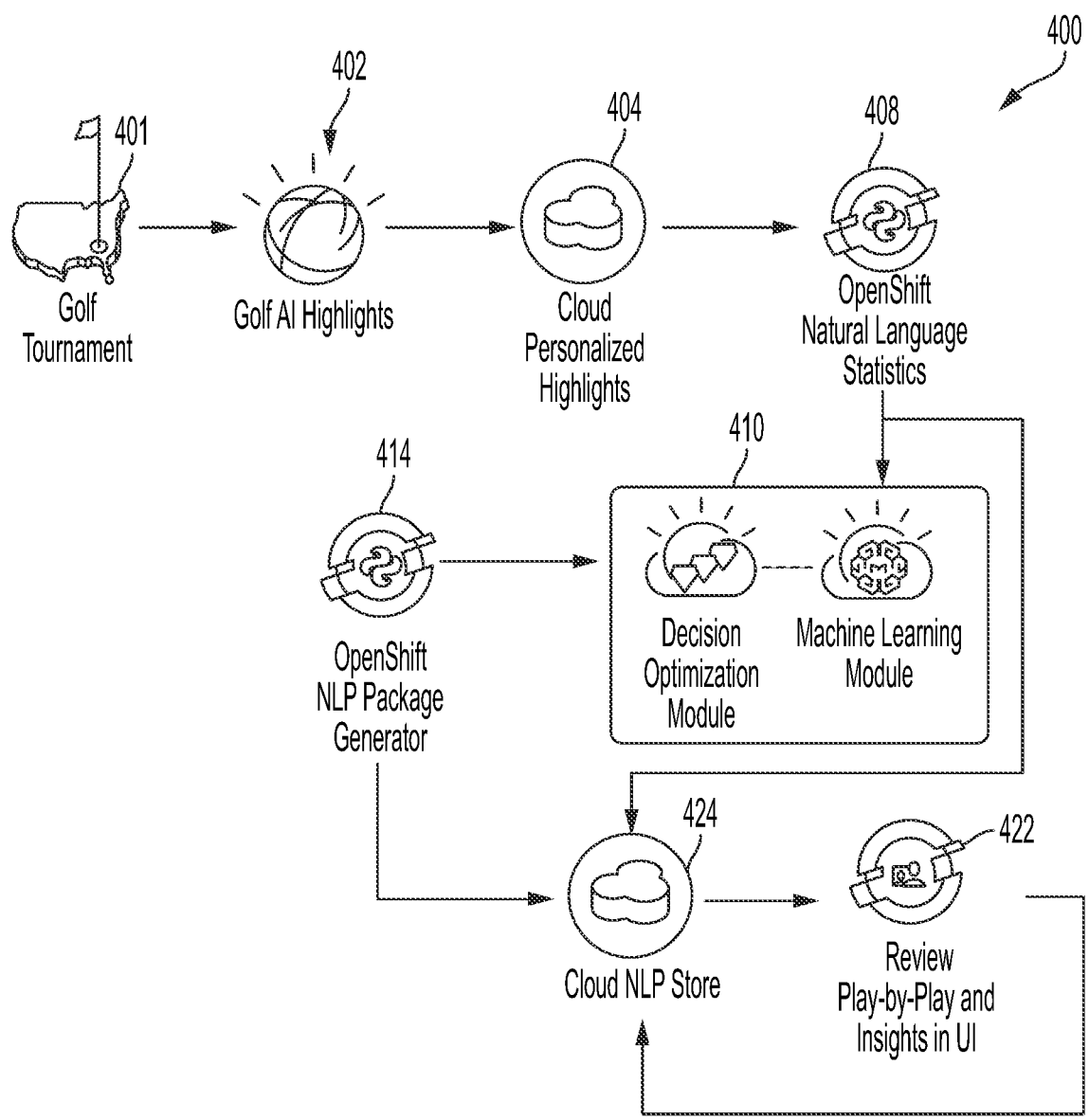
FIG. 4 illustrates a first implementation example enabled by the system of FIG. 1 for improving software technology associated with generating and packaging natural language templates and phrases for selection associated with video stream presentation, in accordance with embodiments of the present invention.

FIG. 4 illustrates a first implementation example 400 enabled by system 100 of FIG. 1 for software technology associated with generating and packaging natural language for selection associated with video stream presentation associated with a golf tournament, in accordance with embodiments of the present invention. Implementation example 400 is executed by natural language statistical software 408 configured to run and pull data from a cloud based database 404. Cloud based database 404 comprises retrieved personalized highlights 402 (e.g., golf tournament highlights 401) associated with video streams. Metadata (within cloud based database 404) is configured to describe an excitement level of associated with a highlight clip (e.g., crowd cheer, gestures, commentator tone, analytics, etc.). Additionally, natural language statistical software 408 automatically connects to a database system 410 and retrieves associated statistical data. The statistical is converted into natural language sentences. Each level (of the natural language sentences) in combination with an ontological tree is used to organize sentences and code. Subsequently, a NLP package generator module 414 runs binning software with respect to each tree level (of the ontological tree) to generate associated software packages. All results are stored within a cloud based data store 424. Resulting data may be additionally reviewed by human entities 422 for reevaluation within cloud based data store 424.

Figure 5:
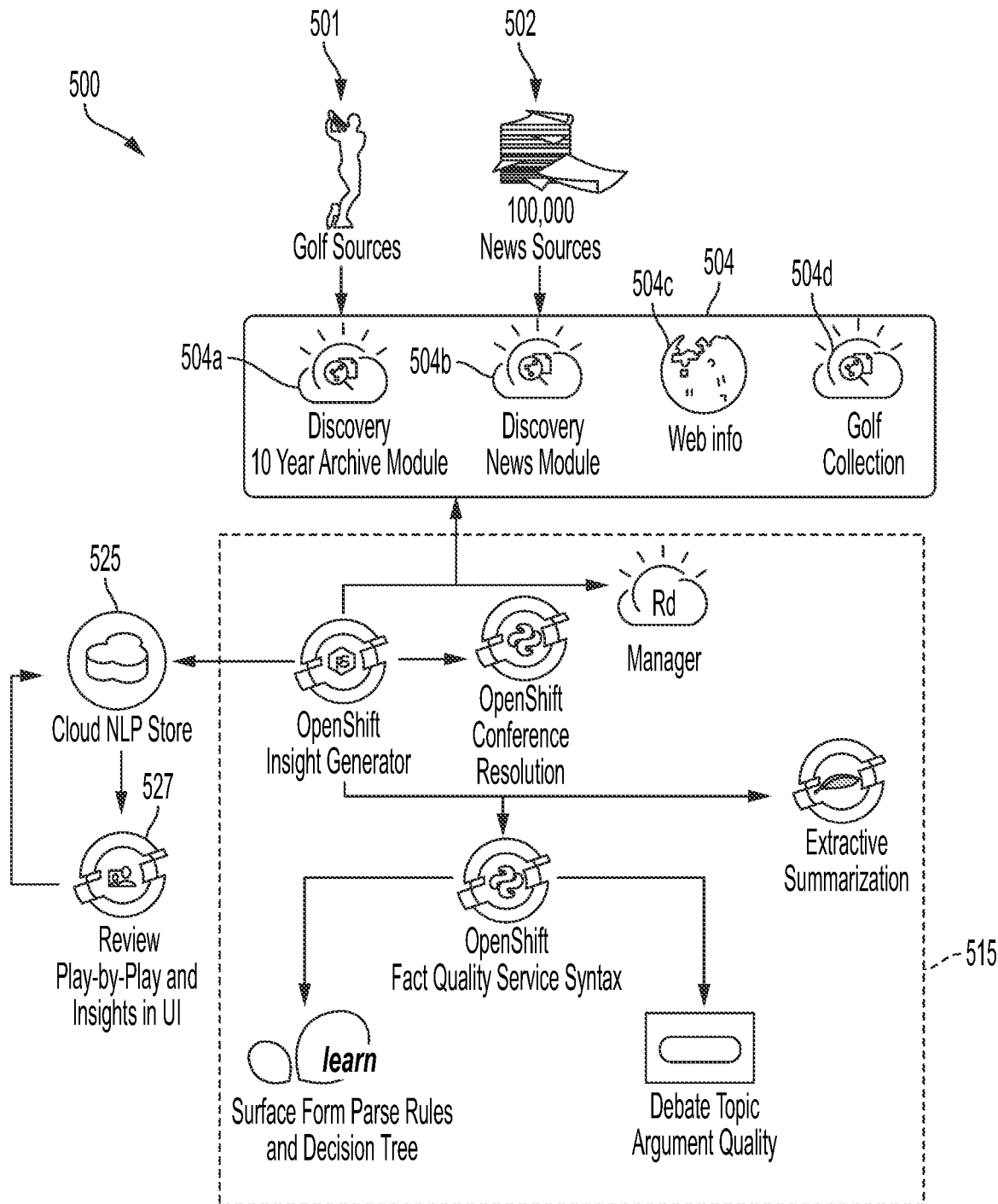
FIG. 5 illustrates a second implementation example enabled by the system of FIG. 1 for improving software technology associated with generating and packaging natural language templates and phrases for selection associated with video stream presentation, in accordance with embodiments of the present invention.

FIG. 5 illustrates a second implementation example 500 enabled by system 100 of FIG. 1 for software technology associated with generating and packaging natural language for selection associated with video stream presentation, in accordance with embodiments of the present invention. Implementation example 400 is executed by insight generator software 515 configured to query digital articles from media sources 504 comprising media retrieval software/hardware modules 504a . . . 504n retrieving information from sources 501 and 502. The articles are summarized via an extractive summarization process. Each of the summarized sentences are organized based on quality measures. For example, it may be determined how fluent a sentence with respect to a surface and semantic form. Subsequently, sentences are combined via packaging with natural language generated sentences and code from statistics. The package are created to balance diversity and quality. The packages are uploaded to a cloud based NLP store 525 and made available for human 527 review for reevaluation within cloud based data store 525.

Figure 6:
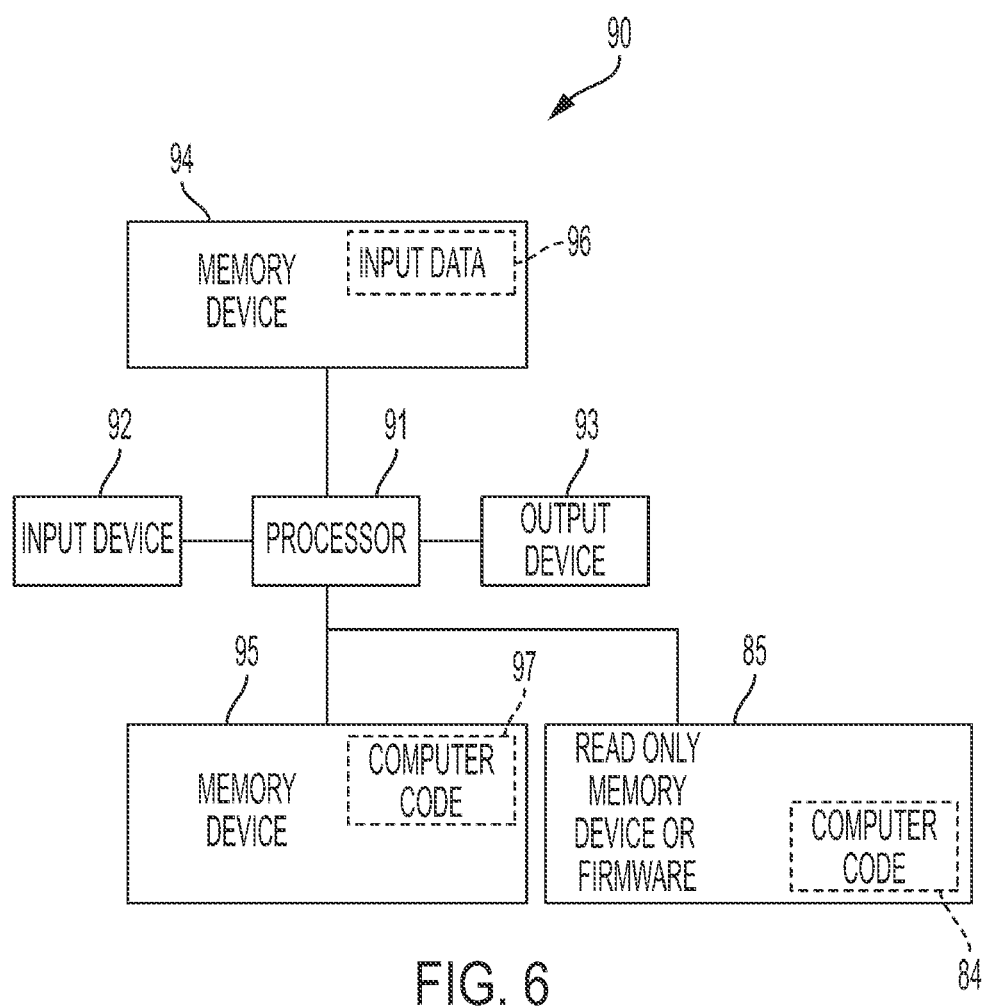
FIG. 6 illustrates a computer system used by the system of FIG. 1 improving software technology associated with generating and packaging natural language code for selection associated with video stream presentation, in accordance with embodiments of the present invention.

FIG. 6 illustrates a computer system 90 (e.g., server hardware 14, hardware/software sources 25, and hardware device 31 of FIG. 1) used by or comprised by the system 100 of FIG. 1 for improving software technology associated with generating and packaging natural language code for selection associated with video stream presentation, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving software technology associated with generating and packaging natural language code for selection associated with video stream presentation. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with generating and packaging natural language code for selection associated with video stream presentation. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with generating and packaging natural language code for selection associated with video stream presentation. In another embodiment, the invention provides a business method that performs the process steps of the invention on a subscription, advertising, and/or fee basis. That is, a service supplier, such as a Solution Integrator, could offer to enable a process for improving software technology associated with generating and packaging natural language code for selection associated with video stream presentation. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
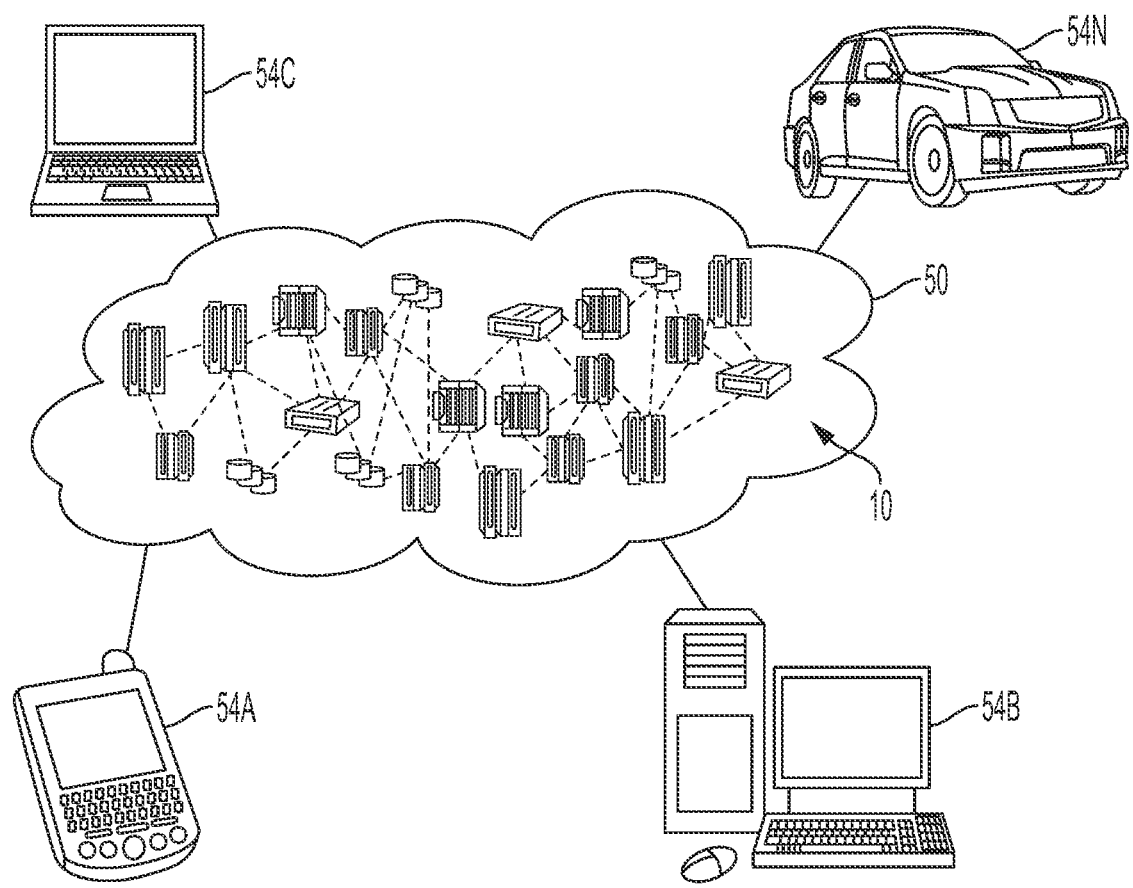
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 8:
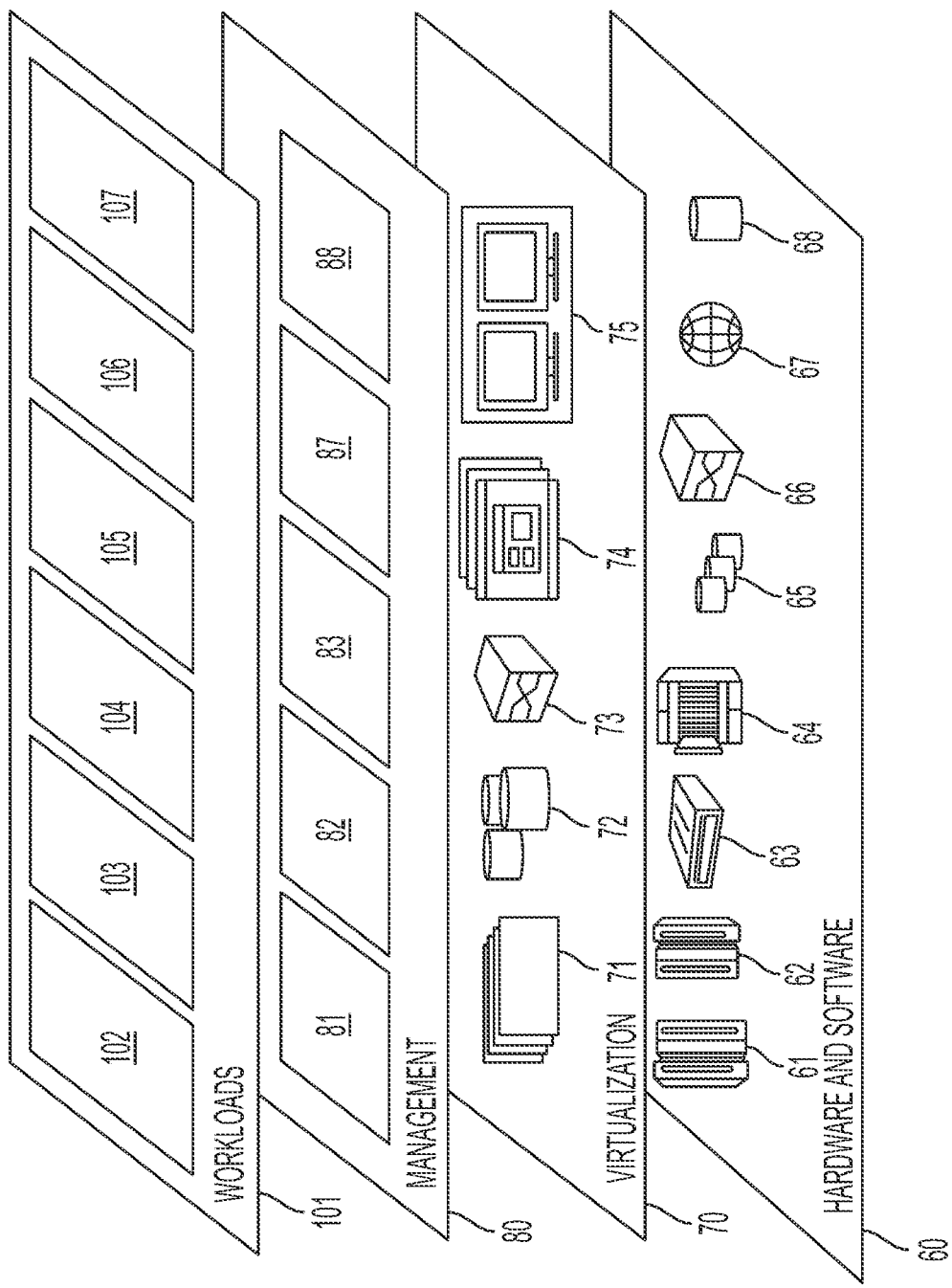
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving software technology associated with generating and packaging natural language code for selection associated with video stream presentation 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A machine learning natural language digital package generation and selection method comprising:
   receiving, by a processor of a server hardware device from a plurality of hardware and software sources, factual data associated with an event;
   generating by said processor in response to said receiving said factual data, natural language digital templates comprising natural language phrase variants for each portion of said factual data;
   generating by said processor, a plurality of factual data phrases for said digital templates;
   packaging, by said processor, said plurality of factual data phrases into digital packages comprising at least one natural language phrase variant of said natural language phrase variants with respect to each said portion of said factual data;
   selecting by said processor executing natural language code, an initial package of said digital packages by minimizing a number of repetitions of said factual data phrases across said digital packages;
   extracting from Internet sources, by said processor, digital summaries associated with said initial package;
   determining, by said processor, alignment attributes associated with said digital summaries with respect to said initial package;
   selecting, by said processor with respect to initialization for a user, a final package of said digital packages, wherein the final package comprises a group of factual data phrases of said factual data phrases optimized for minimized repetitions and maximized quality; and
   enabling, by said processor, a hardware device for presenting a video stream comprising said final package with respect to said event,
   wherein:
      said minimizing comprises: assigning a specified number of selected natural language phrase variants, within selected packages of said digital packages, equal to a number of desired phrases and a natural language phrase variant for each said portion of said factual data included within an associated digital package, wherein a total count of phrase variants does not exceed a maximum number of inclusions for a single portion of said factual data, and wherein each said natural language phrase variant is equal to or exceeds a specified quality volume floor;
      said selecting said initial package comprises: assigning each data phrase of said plurality of factual data phrases to a single bin of a plurality of bins, wherein a total quality volume of all factual data phrases within each bin of said plurality of data bins does not exceed a pre-determined level and a total number of said plurality of bins, wherein only one statistical phrase is assigned to each bin of said plurality of bins, and wherein said total quality volume for each statistical phrase does not exceed said total quality volume of an assigned bin; or
      a combination thereof.

2. The method of claim 1, wherein said number of repetitions are associated with single phrase repetition constraints.

3. The method of claim 1, wherein said number of repetitions are associated with multiple phrase repetition constraints.

4. The method of claim 1, wherein said factual data comprises statistical data and media related data associated with said event.

5. The method of claim 1, wherein said method comprises:
   executing $$r = \sum_{i=1}^{n} y_i r_i,$$

wherein r=a number of phrase repetitions within said initial package, wherein n=a number of phrase variants of said natural language phrase variants analyzed with respect to said factual data, wherein $y_i$=inclusion of a phrase variant i within said initial package, wherein said inclusion=1, wherein an associated exclusion=0, and wherein $r_i$=a number of phrase repetitions within a phrase variant i.

6. The method of claim 1, further comprising:
   maximizing, by said processor, a phrase variety by maximizing an associated entropy, wherein specified values of said associated entropy indicate a greater variety within a statistical phrase, wherein calculating said associated entropy comprises executing $$H(p) = -\sum_{i} p_i \log p_i,$$

wherein H=said associated entropy, wherein p=an associated probability, and wherein i=word or token index associated with said associated entropy.

7. The method of claim 1, further comprising:
   generating, by said processor, self learning software code for executing future processes associated with executing said machine learning natural language code generation and optimization method; and
   storing, by said processor, said self learning software code within a modified portion of a memory structure of said server hardware device.

8. The method of claim 1, further comprising:
   providing at least one support service for at least one of creating, integrating, hosting, maintaining, and deploying computer-readable code in the control hardware, said code being executed by the computer processor to implement; said receiving, said generating said natural language digital templates, said generating said plurality of factual data phrases, said packaging. said selecting said initial package, said extracting, said determining, said selecting said final package, and said enabling.

9. A computer program product, comprising a computer readable hardware storage device storing a computer readable program code, said computer readable hardware storage device not being a transitory signal, said computer readable program code comprising an algorithm that when executed by a processor of a server hardware device implements a machine learning natural language digital package generation and selection, said method comprising:
   receiving, by said processor from a plurality of hardware and software sources, factual data associated with an event,
   generating by said processor in response to said receiving said factual data, natural language digital templates comprising natural language phrase variants for each portion of said factual data;
   generating by said processor, a plurality of factual data phrases for said digital templates;

packaging, by said processor, said plurality of factual data phrases into digital packages comprising at least one natural language phrase variant of said natural language phrase variants with respect to each said portion of said factual data;

selecting by said processor executing natural language code, an initial package of said digital packages by minimizing a number of repetitions of said factual data phrases across said digital packages;

extracting from Internet sources, by said processor, digital summaries associated with said initial package;

determining, by said processor, alignment attributes associated with said digital summaries with respect to said initial package;

selecting, by said processor with respect to initialization for a user, a final package of said digital packages, wherein the final package comprises a group of factual data phrases of said factual data phrases optimized for minimized repetitions and maximized quality; and enabling, by said processor, a hardware device for presenting a video stream comprising said final package with respect to said event, wherein:
said minimizing comprises: assigning a specified number of selected natural language phrase variants, within selected packages of said digital packages, equal to a number of desired phrases and a natural language phrase variant for each said portion of said factual data included within an associated digital package. wherein a total count of phrase variants does not exceed a maximum number of inclusions for a single portion of said factual data, and wherein each said natural language phrase variant is equal to or exceeds a specified quality volume floor;

said selecting said initial package comprises: assigning each data phrase of said plurality of factual data phrases to a single bin of a plurality of bins, wherein a total quality volume of all factual data phrases within each bin of said plurality of data bins does not exceed a pre-determined level and a total number of said plurality of bins, wherein only one statistical phrase is assigned to each bin of said plurality of bins, and wherein said total quality volume for each statistical phrase does not exceed said total quality volume of an assigned bin; or a combination thereof.

10. The computer program product of claim 9, wherein said number of repetitions are associated with single phrase repetition constraints.

11. The computer program product of claim 9, wherein said number of repetitions are associated with multiple phrase repetition constraints.

12. The computer program product of claim 9, wherein said factual data comprises statistical data and media related data associated with said event.

13. The computer program product of claim 9, wherein said method comprises:
executing $$r = \sum_{i=1}^{n} y_i r_i,$$

wherein r=a number of phrase repetitions within said initial package, wherein n=a number of phrase variants of said natural language phrase variants analyzed with respect to said factual data, wherein $y_i$=inclusion of a phrase variant i within said initial package, wherein said inclusion=1, wherein an associated exclusion=0, and wherein n=a member of phrase repetitions within a phrase variant i.

14. The computer program product of claim 9, wherein said method further comprises:
maximizing, by said processor, a phrase variety by maximizing an associated entropy, wherein specified values of said associated entropy indicate a greater variety within a statistical phrase, wherein calculating said associated entropy comprises executing $$H(p) = -\sum_i p_i \log p_i,$$

wherein H=said associated entropy, wherein p=an associated probability, and wherein i=word or token index associated with said associated entropy.

15. The computer program product of claim 9, wherein said method further comprises:
generating, by said processor, self learning software code for executing future processes associated with executing said machine learning natural language code generation and optimization method; and storing, by said processor, said self learning software code within a modified portion of a memory structure of said server hardware device.

16. A server hardware device comprising a processor coupled to a computer-readable memory unit, said memory unit comprising instructions that when executed by the computer processor implements a machine learning natural language digital package generation and selection method comprising:

receiving, by said processor from a plurality of hardware and software sources, factual data associated with an event;

generating by said processor in response to said receiving said factual data, natural language digital templates comprising natural language phrase variants for each portion of said factual data;

generating by said processor, a plurality of factual data phrases for said digital templates;

packaging, by said processor, said plurality of factual data phrases into digital packages comprising at least one natural language phrase variant of said natural language phrase variants with respect to each said portion of said factual data;

selecting by said processor executing natural language code, an initial package of said digital packages by minimizing a number of repetitions of said factual data phrases across said digital packages;

extracting from Internet sources, by said processor, digital summaries associated with said initial package;

determining, by said processor, alignment attributes associated with said digital summaries with respect to said initial package;

selecting, by said processor with respect to initialization for a user, a final package of said digital packages, wherein the final package comprises a group of factual data phrases of said factual data phrases optimized for minimized repetitions and maximized quality; and enabling, by said processor, a hardware device for presenting a video stream comprising said final package with respect to said event, wherein:
   said minimizing comprises: assigning a specified number of selected natural language phrase variants, within selected packages of said digital packages, equal to a number of desired phrases and a natural language phrase variant for each said portion of said factual data included within an associated digital package, wherein a total count of phrase variants does not exceed a maximum number of inclusions for a single portion of said factual data, and wherein each said natural language phrase variant is equal to or exceeds a specified quality volume floor;
   said selecting said initial package comprises: assigning each data phrase of said plurality of factual data phrases to a single bin of a plurality of bins, wherein a total quality volume of all factual data phrases within each bin of said plurality of data bins does not exceed a pre-determined level and a total number of said plurality of bins, wherein only one statistical phrase is assigned to each bin of said plurality of bins, and wherein said total quality volume for each statistical phrase does not exceed said total quality volume of an assigned bin; or
   a combination thereof.

* * * * *